Figure 1:
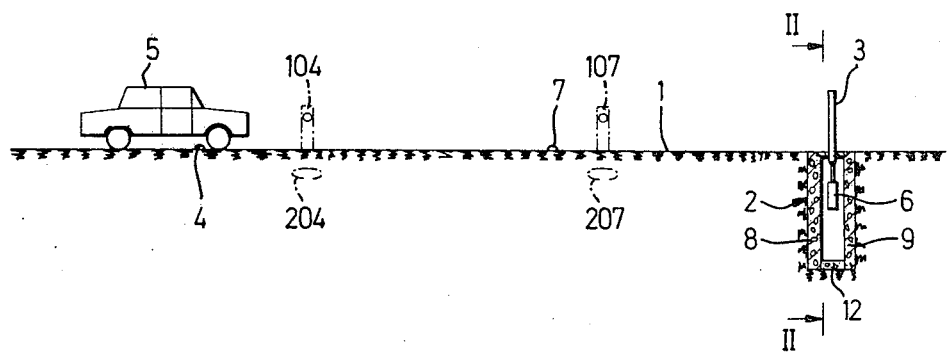

United States Patent [19]
Gambon

[11] 4,121,356
[45] Oct. 24, 1978

[54] DRIVER TRAINING INSTALLATIONS

[76] Inventor: Albert Gambon, Kirchfeldstrasse 18, 3600 Thun, Switzerland

[21] Appl. No.: 815,087

[22] Filed: Jul. 13, 1977

[30] Foreign Application Priority Data

Jul. 17, 1976 [DE] Fed. Rep. of Germany ....... 2632313

[51] Int. Cl.² .................................................. G09B 9/04
[52] U.S. Cl. .................................... 35/11 R; 273/105.6
[58] Field of Search ............... 35/11 R, 25; 273/105.6

[56] References Cited

U.S. PATENT DOCUMENTS

| | | | |
|---|---|---|---|
| 2,805,066 | 9/1957 | Mongello | 273/105.6 |
| 3,323,800 | 6/1967 | Knight | 273/105.6 X |
| 3,515,388 | 6/1970 | Zachmeier | 273/105.6 |
| 3,608,210 | 9/1971 | O'Shea | 35/11 R |
| 3,865,373 | 2/1975 | Knight | 273/105.6 X |
| 3,991,485 | 11/1976 | Golenski | 35/11 R |

FOREIGN PATENT DOCUMENTS 1,118,015   6/1968   United Kingdom ................... 273/105.6

*Primary Examiner*—William H. Grieb
*Attorney, Agent, or Firm*—Flehr, Hohbach, Test, Albritton & Herbert

[57] ABSTRACT

An installation for affording a motor vehicle driver practice to improve his reactions and behavior in an emergency situation. A shaft with a movably disposed symbol-bearing member therein is arranged in a test-roadway. Operating devices are provided for moving the symbol-bearing member partway out of the shaft and for completely returning the symbol-bearing member to within the shaft. An electric signal is produced by a device disposed in front of the shaft to control the operating devices when a motor vehicle approaches the shaft. The symbol-bearing member is suddenly caused to move out of the shaft when a motor vehicle approaches the shaft and returned before the vehicle reaches the symbol-bearing member.

5 Claims, 4 Drawing Figures

DRIVER TRAINING INSTALLATIONS

This invention relates to an installation, including a stretch of roadway, for affording a motor vehicle driver practice to improve his reactions and behavior in an emergency situation.

Present-day driving instruction very often lacks practical training in keeping control of the vehicle when unexpected obstacles suddenly appear on the road. Moreover, most average drivers are so paralyzed by fear when the danger of a collision suddenly arises that they either slam on the brakes and steer directly toward the obstacle or else lose control of the vehicle by instinctively and abruptly swerving.

A makeshift solution which has already been tried is to roll old tires out onto the road from a concealed position as the vehicle approaches in order to test the driver's reaction. Furthermore, according to an item in *Automobil-Revue* (16) : p.29, Apr. 15, 1976, for example, in the United States a plastic barrel is thrown into the road to test driver reaction. By means of these two methods, the novice driver's reactions can be tested in a situation true to reality and without any great actual danger. However, these methods present the following drawbacks: first of all, an additional person is needed to roll out the tires or to throw the barrels; secondly, the varying and subjective reactions of that additional person must be taken into consideration in judging the behavior of the driver to be tested; and thirdly, it is not possible to eliminate completely all the damage which may be done to the vehicle by the tires or barrels, e.g., windshield breakage.

It is an object of this invention to provide an installation of the type initially mentioned which does not present the aforesaid drawbacks.

To this end, the training installation according to the present invention comprises a shaft dug in the roadway, a symbol-bearing member movably disposed in the shaft, operating means for moving the symbol-bearing member partway out of the shaft and for completely returning the symbol-bearing member to within the shaft, one or more devices disposed in front of the shaft for generating an electric signal when the motor vehicle approaches the shaft, and control means for controlling the operating means as a function of the electric signal, whereby the symbol-bearing member is suddenly caused to move partway out of the shaft and then returned to within the shaft after a period of time corresponding to the time required for the vehicle to travel unbraked from one of the signal-generating devices to the shaft.

Figure 2:
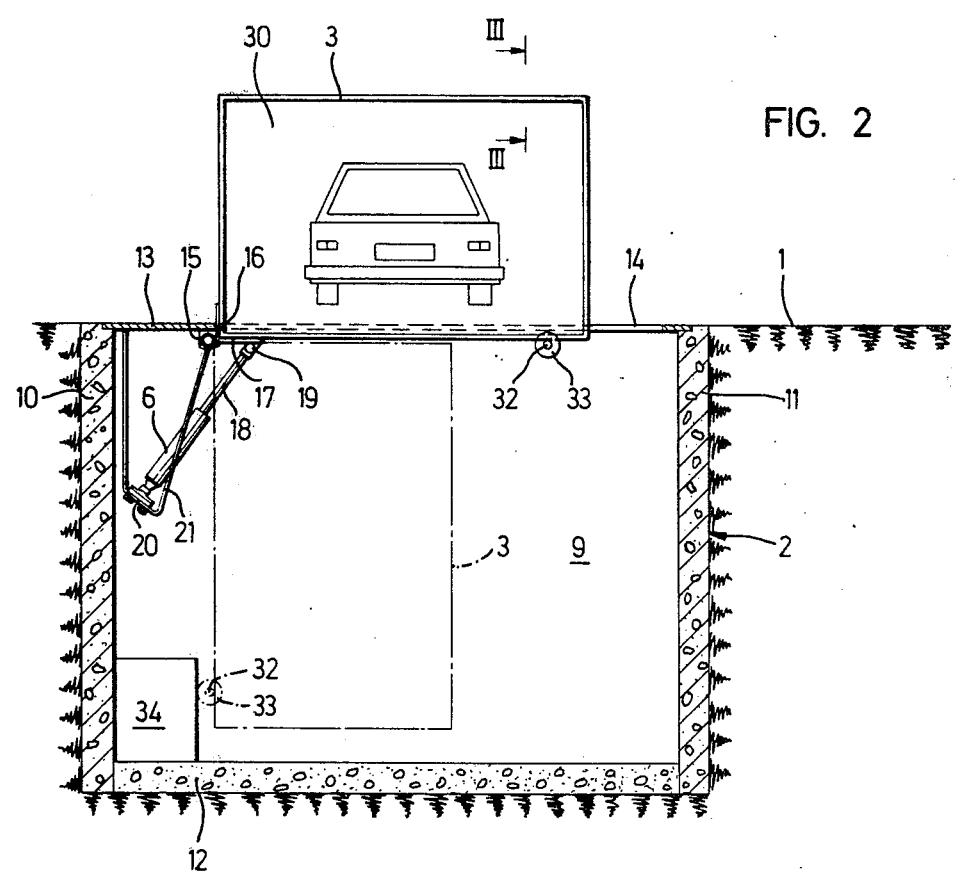
Figure 3:
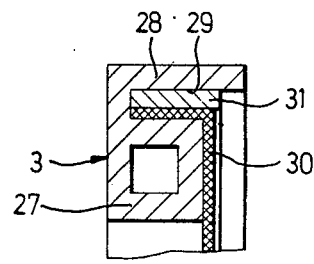
Figure 4:
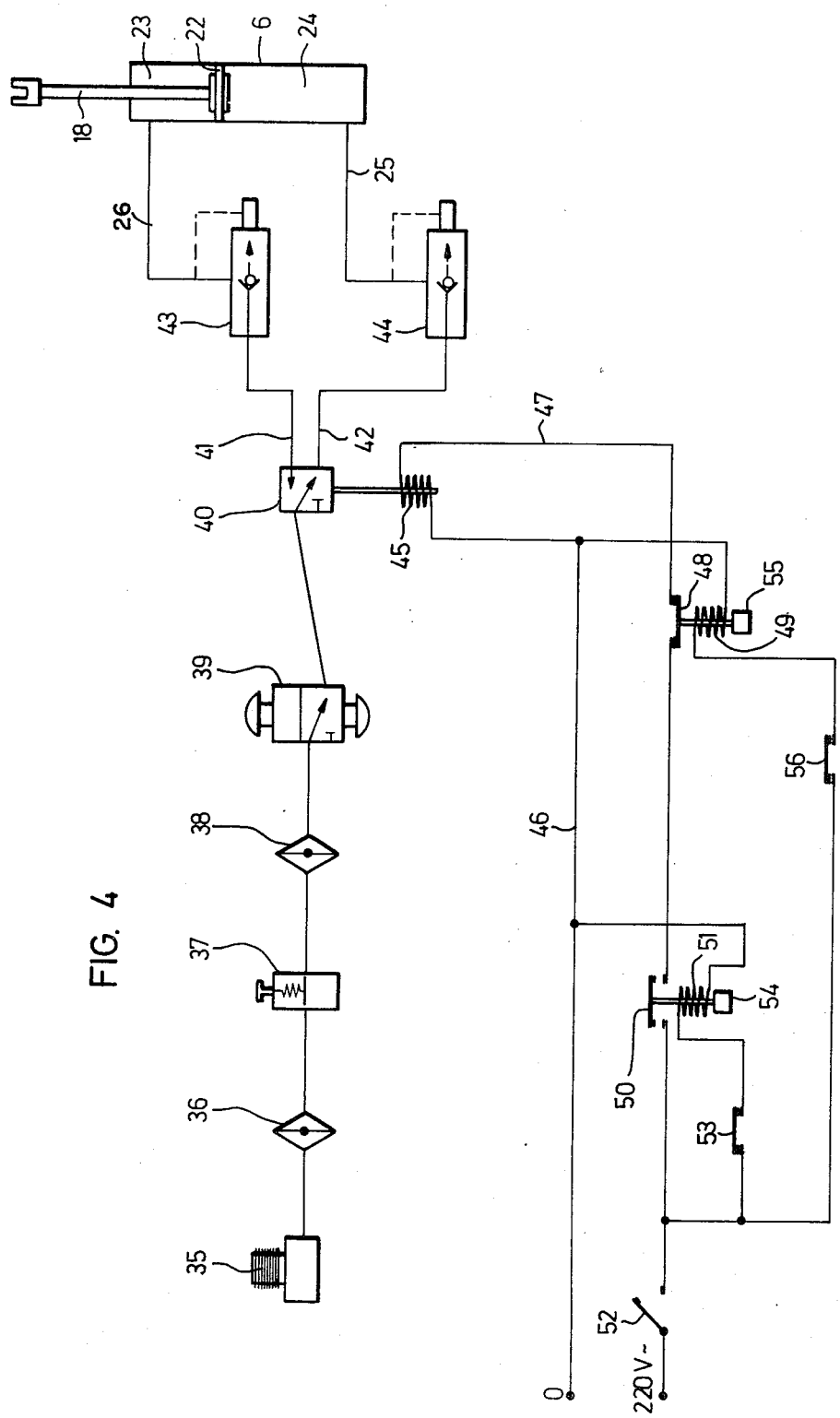

A preferred embodiment of the invention will now be described in detail with reference to the accompanying drawings, in which:

FIG. 1 is a longitudinal section through a portion of the roadway forming part of the installation according to the invention, FIG. 2 is a section taken on the line II—II of FIG. 1 and an elevation of a frame which can be lowered into the roadway, FIG. 3 is a section taken on the line III—III of FIG. 2, and FIG. 4 is a diagram of operating means for the frame shown in FIG. 2 and of control means for the operating means.

A portion of roadway 1 shown in FIG. 1 comprises a shaft 2 into which a frame 3 can be lowered, and at least one contact threshold 4. As soon as a motor vehicle 5 drives over threshold 4, a working cylinder 6 is controlled (in a manner to be described below with reference to FIG. 4) to pivot frame 3, preferably in a plane perpendicular to roadway 1, so that frame 3 suddenly becomes visible to the driver of vehicle 5.

Control means (not shown in FIG. 1) for cylinder 6 may be designed in such a way that after a predetermined amount of time has elapsed, frame 3 disappears back into shaft 2, that period of time being less than the time required for vehicle 5 to travel unbraked from threshold 4 to shaft 2.

The embodiment illustrated in FIG. 1 comprises a second contact threshold 7. Driving over threshold 4 causes frame 3 to pivot into the position shown in FIG. 1, and when vehicle 5 drives over the second threshold 7, frame 3 disappears back into shaft 2. The distance between threshold 7 and shaft 2, or frame 3, is such that the response time of the control means and cylinder 6 plus the time necessary for frame 3 to be pivoted completely back into shaft 2 is somewhat less than the time it takes vehicle 5, without being braked, to cover the aforementioned distance between threshold 7 and shaft 2. This ensures that if the driver does not react, neither vehicle 5 nor frame 3 will be damaged.

Instead of contact thresholds 4 and 7, so-called light barriers 104, 107 or induction loops 204, 207 embedded in the roadway may also be used. The latter in particular cannot be perceived by the driver, and therefore he cannot prepare himself for the obstacle which might appear.

The entire stretch of roadway included in the installation according to the invention comprises a number of portions such as that shown in FIG. 1, each having a pivoting frame 3 and associated contact thresholds. These portions of roadway are preferably activated and deactivated from a central location, i.e., from a control panel (not shown), so that even if the driver drives through the installation several times, he will not be able to memorize the occurences and thereby improve his test results.

FIG. 2 shows shaft 2 on a larger scale. It is of rectangular cross-section and bounded at the sides by two wide sidewalls 8 and 9 and two narrow sidewalls 10 and 11, preferably of concrete. The bottom 12 of shaft 2 is formed by a layer of gravel so that any water which may penetrate can seep into the ground.

Shaft 2 is closed at the top by a plate 13, the upper surface of which is flush with the pavement of roadway 1. Plate 13 includes a longitudinal slot 14 through which frame 3 can be pivoted. Secured to the underside of plate 13 near one end of slot 14 are tongues 15, each having a bore for receiving a bar 16 fixed to an angle plate 17 to which one corner of frame 3 is rigidly screwed so that frame 3 can be pivoted about bar 16. The position of frame 3 when lowered into shaft 2 is indicated in dot-dash lines.

A piston rod 18 of cylinder 6 is pivotally connected to angle plate 17 via an eye 19 secured to the lower arm of angle plate 17. The other end of cylinder 6 is pivotally connected to a support plate 20 held by two substantially U-shaped supports 21 which are rigidly secured to plate 13. As may be seen from FIG. 4, working cylinder 6 is divided by a piston 22 into two working chambers 23 and 24. If a pressure fluid is supplied to chamber 24 over a line 25 (shown only in FIG. 4), piston rod 18 moves partway out of cylinder 6 and moves frame 3 into the position illustrated in FIG. 2. If pressure fluid is supplied to chamber 23 over a line 26 (shown only in FIG. 4), piston rod 18 is drawn into cylinder 6 and moves frame 3 into the position indicated in dot-dash lines in FIG. 2.

FIG. 3 is a cross-section through part of frame 3 on a larger scale. The profile of frame 3 includes a square portion 27, which gives the frame a minimum of stability, and an angular portion 28, the shorter arm of which joins square portion 27 to form the profile. The longer arm of angular portion 28 and one of the side walls of square portion 27 define a groove 29 in which the edge of a net 30, preferably of nylon, is clamped tight by means of a wedging part 31. Net 30 is held taut in frame 3 by parts 31. A symbol of an obstacle is depicted on net 30. In the embodiment illustrated in FIG. 2, this symbol is another vehicle. Frame 3 is preferably made of light metal so that, together with net 30, it weighs as little as possible and thus requires only a small amount of energy to pivot very quickly. Secured to the bottom of frame 3 is a rod 32 (FIG. 2) running at right angles to the frame surface so that rod 32 projects beyond slot 14 on both sides. Both ends of rod 32 are advantageously covered with rubber jackets 33 which resiliently brake and limit the upward swing of frame 3 by striking against the underside of plate 13 and the downward swing by striking against a stop block 34 disposed in shaft 2. Rubber jackets 33 on the ends of rod 32 may be replaced by corresponding pads (not shown) on plate 13 and stop block 34.

The use of net 30 rather than plastic sheeting or paper has the advantage of offering less resistance to any wind which may be blowing when frame 3 is swung upward, thereby reducing the risk of the latter's tipping or twisting.

The size of frame 3 is preferably adapted to the symbol of the obstacle; thus the symbol of a child or animal suddenly running out onto the road will be much smaller than the symbol of a vehicle shown in FIG. 2.

FIG. 4 is a diagram of the operating means for frame 3 and of the control means for controlling the operating means as a function of the state of contact thresholds 4 and 7. The upper half of FIG. 4 shows the operating means. It comprises a compressor 35 which forces air through a filter 36 into a pressure tank 37. At the outlet of tank 37 is a regulating valve, not illustrated in detail, through which compressed air is supplied at substantially constant pressure through an oil trap 38 to a main valve 39. Connected to main valve 39 is a magnetic valve 40 having two outlets 41 and 42. Outlet 41 is connected via a quick exhauster or vent 43 and line 26 to working chamber 23 of cylinder 6, and outlet 42 is connected via a further quick exhauster or vent 44 and line 25 to working chamber 24.

When magnetic valve 40 is at rest, i.e., when its winding 45 is not energized, the inlet of valve 40 is connected to outlet 41 so that chamber 23 is under pressure and pushes piston 22 into its lower position. This means that frame 3 is in the position indicated in dot-dash lines in FIG. 2.

If winding 45 of magnetic valve 40 is energized in a manner to be described below, the inlet of valve 40 is connected to outlet 42, and compressed air is supplied to chamber 24 of working cylinder 6 via quick vent 44 and line 25 so that piston 22, and thus piston rod 18, is moved upward, as a result of which frame 3 is swung into the position shown in FIG. 2. During this operation, the air present in chamber 23 flows through line 26 and quick vent 43 directly into the atmosphere, thereby hastening the pivoting of frame 3.

The lower part of FIG. 4 shows the control means for magnetic valve 40 of the operating means. Winding 45 of valve 40 can be connected over a conductor 46 to the neutral conductor O of the AC mains, on the one hand, and over a conductor 47, a break contact 48 of a relay 49 and a make contact 50 of another relay 51, as well as a main switch 52, to the phase wire of the AC mains, on the other hand. A contact 53 of contact threshold 4 is disposed in the circuit of relay 51, and relay 51 attracts when vehicle 5 drives over threshold 4. The circuit of winding 45 of magnetic valve 40 is thereby closed, and the latter is actuated. In order to keep relay 51 from dropping out again after threshold 4 has been passed, relay 51 is slow-releasing, which is indicated by symbol 54. If vehicle 5 thereafter drives over threshold 7, a contact 56 thereof is closed, and relay 40 attracts. This causes break contact 48 to open and the supply of energy to winding 45 of magnetic valve 40 to be interrupted. As a result, frame 3 is swung back into shaft 2 in order to protect it from harm in case the driver of vehicle 5 does not apply the brakes or swerve away. Relay 49 is also slow-releasing, as shown by symbol 55. The releasing delay of relay 49 is greater than that of relay 51, so that winding 45 of magnetic valve 40 is certain not to be re-energized before contact threshold 4 is actuated.

In the case of a simple installation, the second contact threshold 7 and relay 49 may be omitted if the releasing delay of relay 51 is such that energizing of winding 45 is interrupted before the vehicle which actuates threshold 4 reaches shaft 2 without application of the brakes.

As already mentioned above, the installation comprises a number of such roadway portions as that illustrated in FIG. 1, the main switch 52 of each of these roadway portions being disposed in a control panel (not shown). By closing main switch 52, the respective roadway portion can be activated, i.e. when a vehicle drives over the activated roadway portion, the obstacle associated therewith will appear when contact threshold 4 is crossed. This provides the driving teacher with the possibility of varying the student driver's program.

In the aforementioned control panel, the windings of other magnetic valves associated with other shafts can be connected in parallel to winding 45 in order to cause a further obstacle to appear not only in the lane in which the vehicle is travelling but also in the opposite lane. This shows the driver, for instance, that there is oncoming traffic and that he therefore cannot pull to the left to avoid the obstacle appearing in his own lane. Hence he is obliged to pull to the right to miss the obstacle, so that he must steer out onto the shoulder and stop.

The installation described above makes it possible to fill a gap in the instruction and advanced training of motor vehicle drivers. With such an installation, accident situations like those encountered in actual practice can be simulated, for the student driver or for a licensed driver who wishes to improve his capabilities, on a broad basis, at little expense, and without endangering either the participants or the installation. This installation enables any driver to prepare himself thoroughly for a possible accident situation, thereby making a substantial contribution to traffic safety.

The roadway, which is marked off only by lines painted on the ground at the sides, is wide enough toward the shoulders that the vehicle cannot run into any obstacle if it is forced off the roadway. Since the obstacles are pre-programmed to switch on and off automatically, the driving teacher can ride along with the driver to be tested, can supervise his actions from close at hand, and can intervene if necessary. The installation can be operated and monitored and the results evaluated by just one person.

What is claimed is:

1. An installation for training a driver of a motor vehicle, comprising a roadway, a shaft dug in said roadway, a symbolbearing member movably disposed in said shaft, operating means for moving said symbol-bearing member partway out of said shaft and for completely returning said symbol-bearing member to within said shaft, at least one signal-generating device disposed in front of said shaft for generating an electric signal when said motor vehicle approaches said shaft, and control means for controlling said operating means as a function of said electric signal, whereby said symbol-bearing member is suddenly caused to move partway out of said shaft and then returned to within said shaft after a period of time corresponding to the time required for said motor vehicle to travel unbraked from said signal-generating device to said shaft.

2. The installation of claim 1 comprising a first and a second said signal-generating device, said first device generating a first said electric signal and said second device being disposed between said first device and said shaft for generating a second said electric signal when said vehicle approaches closer to said shaft, and said control means comprising a first relay responsive to said first electric signal and a second relay responsive to said second electric signal.

3. The installation of claim 2, wherein said operating means comprise a compressor for producing compressed air, a magnetic valve controllable by said control means, and a working cylinder for moving said symbol-bearing member.

4. The installation of claim 1, wherein said symbol-bearing member comprises a frame having corners and a coarse-meshed netlike fabric stretched taut over said frame, said frame being pivotable about an axis which is situated near one of said corners and is perpendicular to the surface of said frame.

5. The installation of claim 1, wherein said at least one signal-generating device takes the form of a contact threshold, a light barrier, or an induction loop embedded in said roadway.

* * * * *